(12) United States Patent
Tippelhofer et al.

(10) Patent No.: US 8,989,916 B2
(45) Date of Patent: Mar. 24, 2015

(54) VEHICLE SIGNAL LEVER PROXIMITY SENSING FOR LANE CHANGE INTENTION DETECTION WITH FOLLOWING RECOMMENDATION TO DRIVER

(71) Applicants: Volkswagen AG, Wolfsburg (DE); Audi AG, Ingolstadt (DE)

(72) Inventors: Mario Tippelhofer, San Mateo, CA (US); Trevor Shannon, Menlo Park, CA (US)

(73) Assignees: Volkswagen AG, Wolfsburg (DE); Audi AG, Inglostadt (DE)

( * ) Notice: Subject to any disclaimer, the term of this patent is extended or adjusted under 35 U.S.C. 154(b) by 7 days.

(21) Appl. No.: 13/796,303

(22) Filed: Mar. 12, 2013

(65) Prior Publication Data

US 2014/0277825 A1 Sep. 18, 2014

(51) Int. Cl.
*G08G 1/16* (2006.01)

(52) U.S. Cl.
CPC .................................. *G08G 1/167* (2013.01)
USPC .................................................. 701/1; 74/523

(58) Field of Classification Search
CPC ............ B60W 50/08; B60W 2540/20; B60W 2550/10; G06K 9/00805; G06K 9/00798; B62D 15/029; B62D 15/025; B62D 15/0255; G08G 1/16; B60K 2350/1012; B60K 255/1036; G06F 3/0414; G06F 3/011; G06F 3/044; G06F 3/041; G06F 1/3231; G06F 221/2111; G06F 3/045; G06F 3/0488; G06F 3/04883; G06F 3/03547; G06F 3/0304; H03K 17/962; H03K 17/9622; H03K 2217/960755

USPC .............. 701/1; 340/425.5, 435, 436, 539.23, 340/686.6; 178/178; 324/686; 715/863; 73/718
See application file for complete search history.

(56) References Cited

U.S. PATENT DOCUMENTS

| 7,513,166 | B2 * | 4/2009 | Shank et al. ..................... 73/780 |
| 2002/0149572 | A1 * | 10/2002 | Schulz et al. ................. 345/174 |
| 2009/0327977 | A1 | 12/2009 | Bachfischer et al. |
| 2010/0073152 | A1 * | 3/2010 | Nagamine et al. ......... 340/425.5 |
| 2010/0117970 | A1 * | 5/2010 | Burstrom et al. ............. 345/173 |
| 2010/0295668 | A1 * | 11/2010 | Kataoka ........................ 340/435 |
| 2012/0056490 | A1 | 3/2012 | Bruwer |
| 2013/0069671 | A1 * | 3/2013 | Pedersen et al. .............. 324/679 |
| 2013/0250112 | A1 * | 9/2013 | Breed ........................... 348/148 |
| 2014/0091989 | A1 * | 4/2014 | Szczerba et al. .................. 345/7 |

FOREIGN PATENT DOCUMENTS

| DE | 100 15 726 A1 | 10/2001 |
| DE | 10 2009 038 895 A1 | 9/2010 |
| EP | 2 537 700 A1 | 12/2012 |

(Continued)

*Primary Examiner* — Marthe Marc-Coleman
(74) *Attorney, Agent, or Firm* — Muncy, Geissler, Olds & Lowe, P.C.

(57) ABSTRACT

A system includes a turn signal lever, at least one exterior sensor configured to detect a condition of an area surrounding a vehicle, and a display configured to display information about the condition of the area surrounding vehicle. The turn signal lever includes at least one sensor configured to detect a touch or a proximity of a user's finger or hand. The turn signal lever includes a top sensor and a bottom sensor, which are configured to distinguish between intended actuation of the lever by the user for a left turn or a right turn. The display is configured to display information indicating a degree of safety for performing the intended turn.

23 Claims, 5 Drawing Sheets

(56) References Cited

FOREIGN PATENT DOCUMENTS

| | | | | | |
|---|---|---|---|---|---|
| JP | 2008203055 A | * | 9/2008 | ................ | G01L 1/14 |
| JP | 2009244008 A | * | 10/2009 | ................ | G01L 1/14 |
| WO | WO 2008/131190 A1 | | 10/2008 | | |

* cited by examiner

VEHICLE SIGNAL LEVER PROXIMITY SENSING FOR LANE CHANGE INTENTION DETECTION WITH FOLLOWING RECOMMENDATION TO DRIVER

BACKGROUND OF THE INVENTION

1. Field of the Invention

The present invention relates to vehicle driver assistance systems and more particularly to a method and system for detecting a driver's intention to perform a lane change and providing a recommendation to the driver regarding the intended lane change.

2. Description of the Background Art

Lane change maneuvers on freeways and even urban environments are stressful and often times dangerous due to the difference in speed of the vehicles in neighboring lanes, limited field of view behind and on the sides of the car (i.e., blind spots) as well as the relatively short amount of time in which the maneuver needs to be performed. Drivers have to rely on their view through the interior and exterior mirror to assess the position of vehicles behind them, which often times is not sufficient.

Once the driver makes a decision to change lanes, the driver usually enables the turn signal in either direction before changes lanes. At this point, the decision whether to change lanes has been made and usually the lane change maneuver follows immediately after or even during the signaling process.

Until recently, the lane change decision and execution was solely left to the driver of the vehicle. Recent advancements in sensor technologies provide the ability to monitor the surroundings behind and on the sides of the vehicle to detect vehicles in the blind spot and notify the driver with LEDs in the side wing mirrors if another vehicle is present. Once the signal lever is actuated on the side where another vehicle in a neighboring lane is located, a flashing LED light warns the driver about a possible dangerous situation when performing the lane change under the current traffic conditions.

Moreover, certain in-vehicle interactive control devices have been developed in which a user's intention to engage a control element of the interactive device is detected using sensors.

For example, U.S. Patent Application Publication No. 2009/0327997 discloses an interactive control device configured to ascertain whether a body part of the user is positioned within an active region that is spatially defined with respect to a display positioned within a vehicle console. If a finger or hand of the user is detected within an activation region of the display screen, then the control action associated with the control element is activated. The system is also configured to detect and ascertain dynamic hand/finger gestures. That is, the system is able to detect movement of the user's hand/finger within the active region of the display.

Furthermore, U.S. Patent Application Publication No. 2012/0056490 discloses an electronic circuit for use as a user interface with touch sensor technology that is configured to differentiate between proximity and physical contact events to activate and control loads for light bulbs, products with radio frequency circuitry or electric motors. The electronic circuit controls various functions in response to user actions.

Moreover, DE 102009038895 discloses a control element for operating functions of a device within a vehicle. Specifically, the control element includes a touchpad or a rotary push-controller. The system is configured to detect a posture of a user's body part (e.g., hand, finger) to predict a control that the user intends to use. For a specified control element, the system knows what posture a user's hand must be in to mechanically actuate the control element. With this knowledge, a sensor is configured to detect the posture of a user's body part during a control gesture to determine the intention of the user.

DE 10015726 discloses a driver assistance system with a screen display, which is controlled by a display control unit. Each control element in the display control unit is formed with an integral proximity sensor. As a user's finger/hand approaches one of the control elements, the function of the control element is displayed in a graphical representation on the display screen.

There is currently no system, however, which detects a driver's intention to change lanes prior to the driver actuating the turn signal lever.

SUMMARY OF THE INVENTION

In view of the foregoing and other exemplary problems, drawbacks, and disadvantages of the conventional methods and structures, an exemplary feature of the method and system of the present invention is to detect the driver's intention to change lanes in either direction (left or right lane) even before actuation of the turn signal lever.

In accordance with a first exemplary, non-limiting aspect of the present invention, a system includes a turn signal lever, at least one exterior sensor configured to detect a condition of an area surrounding a vehicle, and a display configured to display information about the condition of the area surrounding the vehicle. The turn signal includes at least one sensor configured to detect a touch or a proximity of a user's finger or hand.

In accordance with a second exemplary, non-limiting aspect of the present invention, a method includes detecting a user's control gesture on a turn signal lever using a sensor, the control gesture being indicative of an intended driving maneuver, transmitting data regarding the user's control gesture to a control unit, determining a condition surrounding a vehicle using an external sensor, transmitting information regarding the condition surrounding the vehicle to the control unit, and displaying a visual representation indicating condition surrounding a vehicle.

In accordance with a third exemplary, non-limiting aspect of the present invention, a turn signal device includes a lever, wherein the lever includes at least one sensor configured to detect a touch or a proximity of a user's finger or hand.

Accordingly, the system (and method) is able to detect the driver's intention to change lanes in either direction (left or right lane) even before actuation of the turn signal lever. Once the driver's intention is detected, the system will let the driver know that it is currently safe to change lanes or merge onto the neighboring lanes for which the intention was detected based on the sensor data analysis. This assurance of lane change safety is directional based on the detection of proximity sensing of the driver's hand/fingers on the turn signal lever. Alternatively, if it is currently unsafe to change lanes (based on sensor analysis of vehicle surroundings), the driver is presented with a human machine interface, which is able to provide recommendations for what to do in order to get to a position (by either slowing down or accelerating) where it is safe to change lanes again. As a result of the information visualization and recommendation to the driver, the driver can actuate the turn signal lever in the anticipated or recommended direction and perform the lane change safely.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus, do not limit the present invention, and wherein.

DETAILED DESCRIPTION

Figure 1:
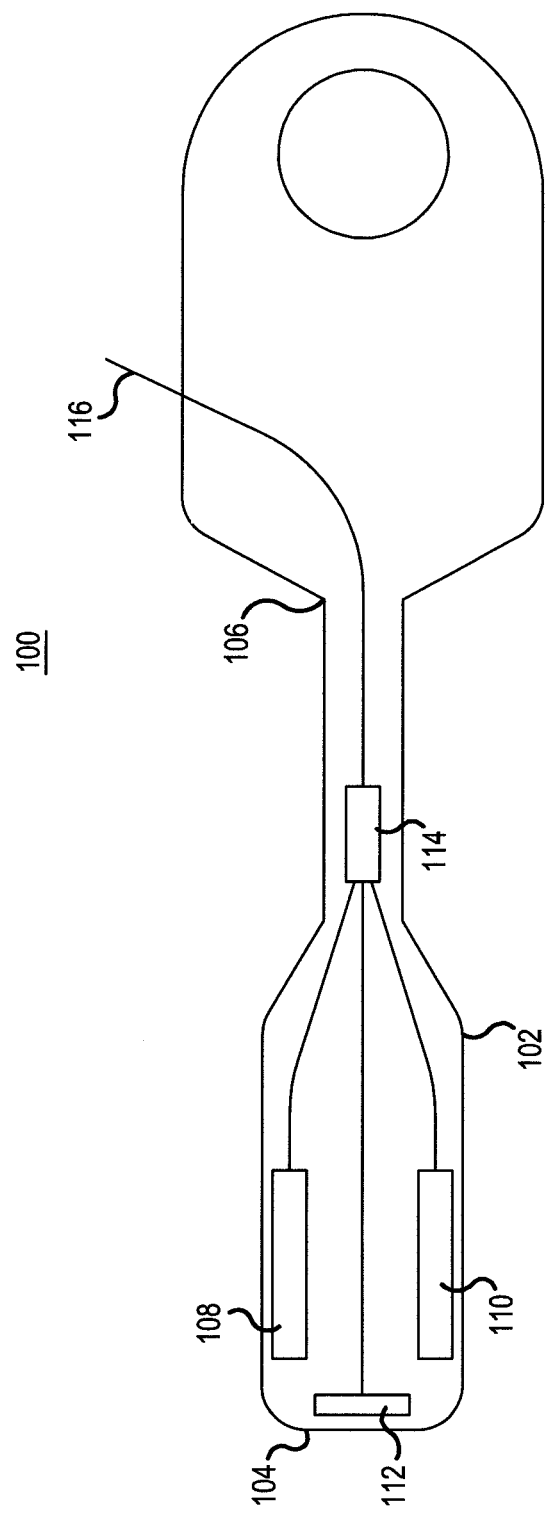
FIG. 1 illustrates a signal lever device 100 according to certain exemplary embodiments of the present invention.

Referring now to the drawings, and more particularly to FIGS. 1-5, there are shown exemplary embodiments of the method and structures according to the present invention.

FIG. 1 illustrates a signal lever device 100 according to certain exemplary embodiments of the present invention. The signal lever device includes a signal lever 102 having a first end 106 configured to be pivotably mounted on a steering column within a vehicle and a distal second end 104, positioned opposite and away from the first end 106 configured to be mounted on the steering column.

A plurality of sensors is disposed on the distal end 104 of the lever 102. As illustrated in FIG. 1, a top sensor 108 is disposed along a top surface of the lever 102, a bottom sensor 110 is disposed along a bottom surface of the lever, and a side sensor 112 is disposed on a side of the distal end 104 of the lever. According to certain exemplary embodiments of the present invention, the sensors 108/110/112 are proximity and touch sensors. Accordingly, the turn signal lever 102 is equipped with proximity and touch sensing capabilities to detect a user's (e.g., a driver's) intent to initiate a lane change by reaching for the turn signal lever 102 without actually activating the lever 102 in either direction. The proximity and touch sensing capabilities may be provided by any one of the following exemplary sensing technologies: capacitive sensing, resistive sensing, inductive sensing, ultrasonic, camera-based, infra-red, magnetic, etc.

In the embodiment illustrated in FIG. 1, the sensors 108/110/112 include capacitive touch/proximity sensors, which provide improved results for near field proximity sensing of hands/fingers in the automotive context. In accordance with an exemplary aspect of the invention, the sensors 108/110/112 include directional sensor antennas (e.g., copper pads) and are configured to detect proximity and touch of a user's hand/finger on the lever from different directions. Accordingly, use of the sensors 108/110/112 allows the system to distinguish between intended actuation of the lever by the driver for a left turn (proximity detection from the top sensor 108) or a right turn (proximity detection from the bottom sensor).

Figure 2A:
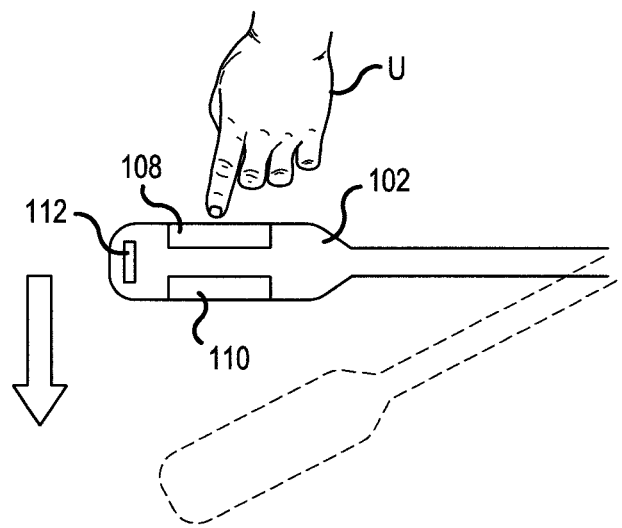
FIGS. 2A and 2B illustrate user interaction with the signal lever device 100.
Figure 2B:
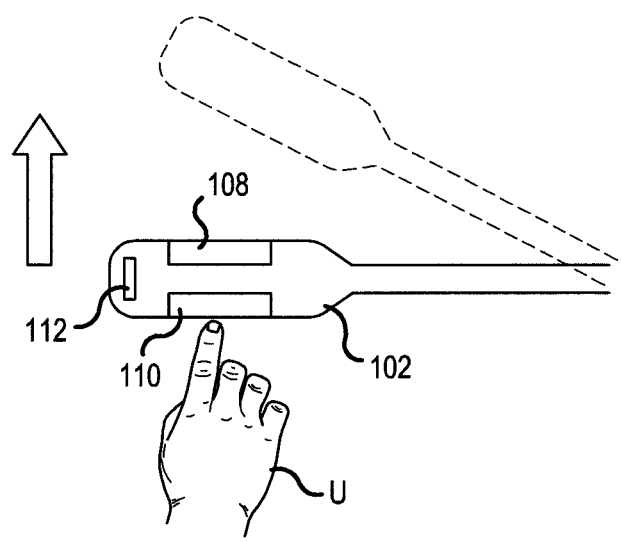

Indeed, FIGS. 2A and 2B illustrate this determination in further detail. Typically, when a user U intends to actuate the signal lever 102 to indicate a left-hand turn or lane change, the user U pushes down on the top of the lever 102, forcing the lever downward to a lower actuated position (FIG. 2A). The top sensor 108 is configured to detect the intended actuation gesture of the user U before the user U actuates the lever 102. Similarly, when a user U intends to actuate the signal lever 102 to indicate a right-hand turn or lane change, the user U pushes up on the bottom of the lever 102, forcing the lever upward to a raised actuated position (FIG. 2B). The bottom sensor 110 is configured to detect the intended actuation gesture of the user U before the user U actuates the lever 102. It is noted that the left hand and right hand signaling configuration is merely an exemplary configuration. The system could also be configured such that an upward motion of the signal lever indicates a left hand turn and a downward motion of the signal lever indicates a right hand turn. The configuration illustrated in FIGS. 2A and 2B merely illustrates a typical signaling configuration. That is, the average driver pushes the lever 102 down from above with one or multiple fingers when intending to turn left (or switch lanes toward the left). When a right hand turn or lane switch is intended, the turn signal lever 102 is typically pushed upward from below with one or more multiple fingers.

The side sensor 112 is configured to be used for false positive elimination and, possibly, for different styles of turn lever actuation by the driver (e.g., a driver who grasps the end of the lever 102 as opposed to merely pressing the top or bottom of the lever).

A dedicated electronic control unit (ECU) 114 is disposed within the lever 102 and configured to communicate with the sensors 108/110/112. The ECU 114 is, according to the embodiment illustrated in FIG. 1, disposed proximate the sensors 108/110/112. Specifically, information from the sensors 108/110/112 is read and processed by the ECU. An interface 116 (e.g., CAN, Flexray, etc.) is provided for connecting the ECU 114 to other components/systems in the vehicle.

Figure 3:
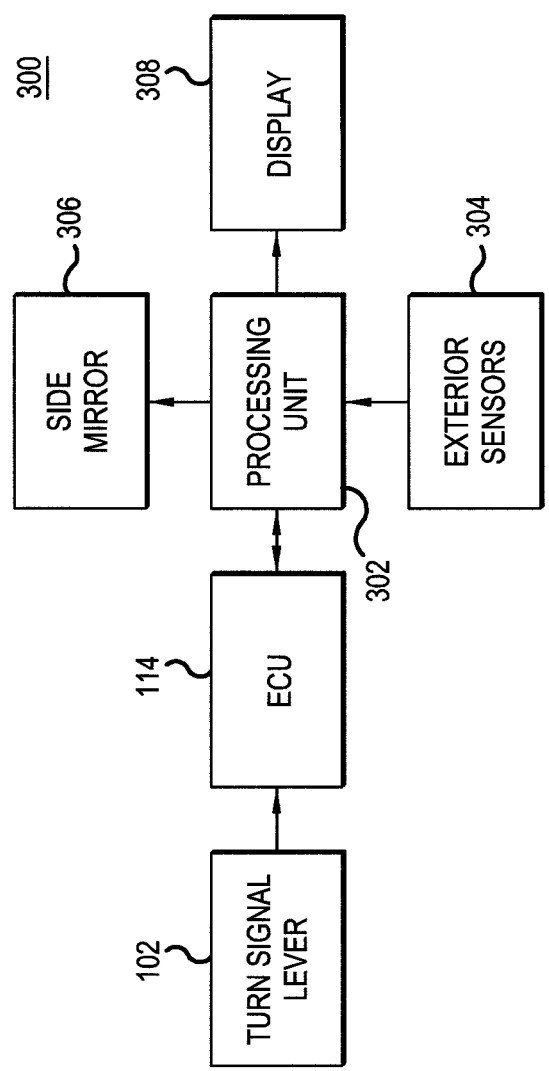
FIG. 3 illustrates a block diagram of a system 200 incorporating the signal lever device 100 according to certain exemplary embodiments of the present invention.

FIG. 3 illustrates an overall system 300 architecture, for an application in the automotive context, incorporating the signal lever device 100. Again, information from the sensors in the signal lever 102 is transmitted to the dedicated ECU 114. Once the ECU processes the sensor information, the ECU 114 sends the processed information, through the interface 116, to a main control processing unit 302 for further control of a human machine interface. The main control processing unit 302 includes a processor configured to receive and further process information from the ECU 114. The main processing control unit 302 may be either a dedicated unit or part of the overall vehicle system.

Furthermore, the main processing control unit 302 receives sensor information from one or more exterior sensors 304. The exterior sensors 304 are configured to detect information regarding a condition of the area surrounding the vehicle. Specifically, the exterior sensors 304 are configured to determine whether it is safe to turn or switch lanes by detecting, for example, the presence of other vehicles in the adjacent lane. The exterior sensors 304 may include, for example but not limited to, radar, LIDAR, camera-based, etc. The data from the sensors 108/110/112 is used to trigger a visualization of the data from the exterior sensors 304 through an appropriate human machine interface, which is described in further detail below.

As detailed above, the direction (e.g., right or left) of the intended lane change can be assumed depending on whether the proximity of the user U (e.g., user's hand or fingers) is detected below or above the turn signal lever 102. If either of the top sensor 108 or bottom sensor 110 detects a proximity motion or touch, the appropriate human machine interface for the respective turn direction is actuated. When the top sensor 108 and the bottom sensor 110 and/or the side sensor 112 detect the proximity and/or touch of a user U, the intended direction of the turn/lane change can not be assumed. In this case, the visualization is provided for both directions (right and left) on the human machine interface.

As is illustrated in FIG. 3, the human machine interface includes a display 308 and/or an interface on the vehicle side mirrors 306. The display 308 includes a display screen positioned in view of the user U within the vehicle passenger compartment. The vehicle side mirrors 306 include an indicator disposed on the side mirrors.

Figure 4:
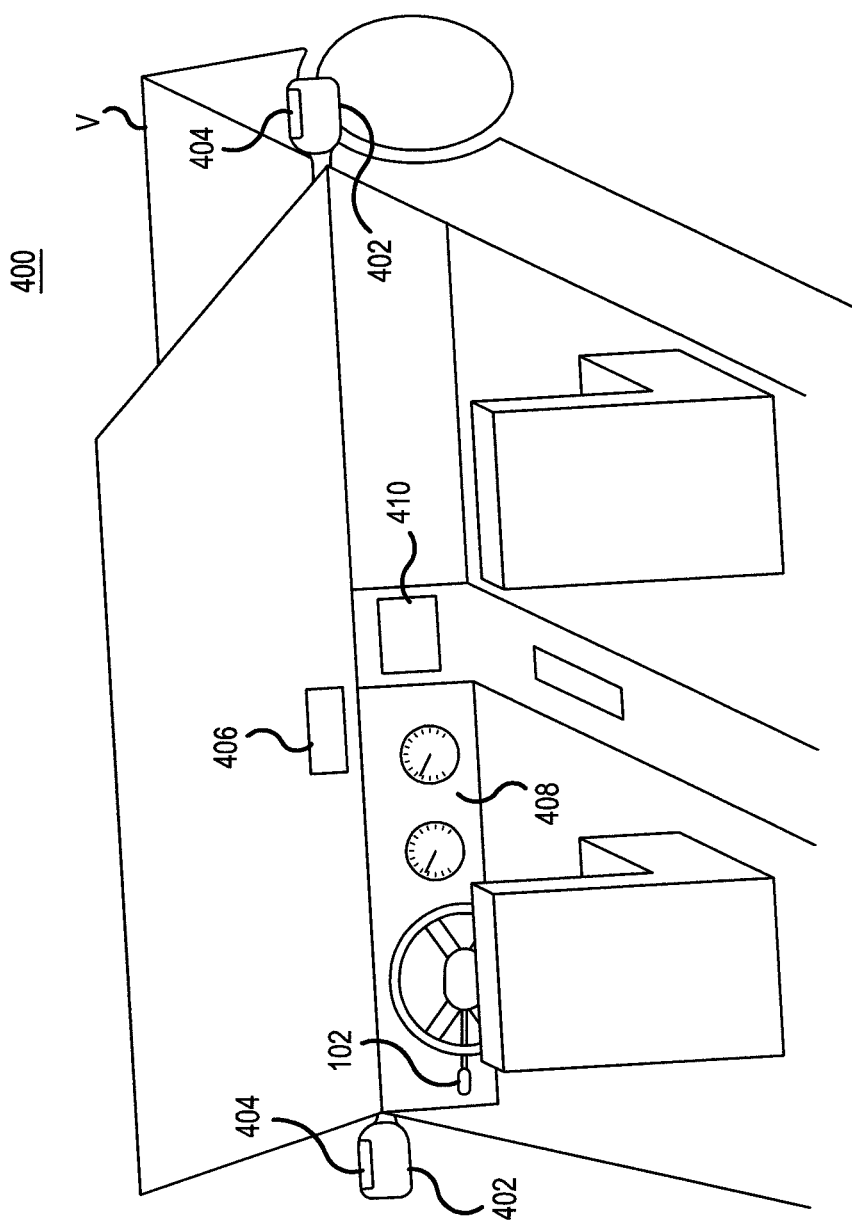
FIG. 4 illustrates the signal lever device 100 incorporated into a vehicle system 400.

FIG. 4 illustrates the above-described system incorporated into a vehicle system 400. In the embodiment illustrated in FIG. 4, the signal lever 102 is attached to a steering column within a vehicle V. The vehicle V typically includes two side mirrors 402 (e.g., left and right). Each side mirror 402 is equipped with a human machine interface for visualizing data from the exterior sensors. In the embodiment illustrated in FIG. 4, each side mirror 402 is equipped with an LED strip 404.

As detailed above, the human machine interface may also include a display 308. The display 308 may be configured as (or as a part of) a dashboard/console display screen 410. Alternatively, the display 308 may be configured as (or as a part of) a heads-up display 406. Lastly, the display may be incorporated into the instrument cluster 408. The display 308 and the LED strip 404 may be used together or individually as the human machine interface. The visualization will be provided on the mirror (e.g., right or left) that corresponds to the determined direction of the intended maneuver (e.g., right or left). In the event the determination cannot be assumed, both LED strips 404 will display a visualization. The visualization in each LED strip 404 will indicate the status of the conditions on the particular side of the vehicle on which the strip 404 is positioned. Thus, each strip 404 may provide a different visualization (recommendation).

The human machine interface (side mirror strip and/or display) provides a visualization of the data from the exterior sensors 304. Specifically, the visualization of the data from the exterior sensors 304 indicates whether it is currently safe to turn/change lanes and acts a recommendation to the user. The visualization on the side mirror LED strip 404 may be a color-coded visualization (e.g., green=safe, red=not safe, etc.). This same color coded information may be provided on the dashboard display 410, the heads-up display 406, and the instrument cluster 408 and even on the rearview mirror.

Additionally, a higher resolution visualization can be displayed in the dashboard display 410, the heads-up display 406 and/or the instrument cluster 408. This visualization can show a more detailed overview (e.g., map, photographic image, video display, etc.) of the surrounding environment (e.g., neighboring lanes) and what the driver has to do in order to make a safe lane change.

The system may also be adapted to an individual user (e.g., driver) by learning the behavior of the user when actuating the turn signal lever 102. Since the proximity sensing precedes the actuation of the turn lever, the information about the direction, sensor readings, and timing can be used to learn how the individual driver typically actuates the turn signal lever in either direction. With this information, the direction detection can be adjusted for the particular driver.

Furthermore, the system may be configured such that its features are only available in certain circumstances. For example, the system may be limited to only lane change situations or when the car is on a freeway (e.g., when the vehicle is traveling above certain speeds).

Figure 5:
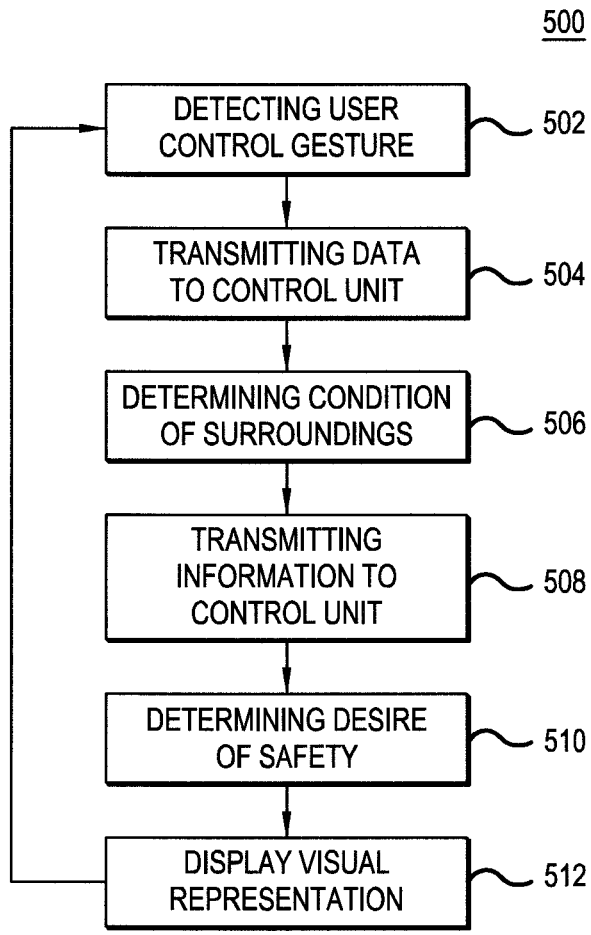
FIG. 5 illustrates a flow chart for a method 500 according to certain exemplary embodiments of the present invention.

FIG. 5 illustrates a flow chart for a method 500 according to certain exemplary embodiments of the present invention. The method 500 includes detecting a user control gesture (e.g., proximity or touch) (502). Once a user control gesture is detected, the system and method are initiated. The proximity/touch sensing data, indicating which direction the user intends to perform a desired driving maneuver (e.g., lane change), is then transmitted to the main control unit (504). Additionally, information from the exterior sensors is detected (506) and is transmitted to the main control unit (508). Based on the user control data and the information from the exterior sensors, a degree of safety of performing the intended driving maneuver is determined (510). A visual representation of a recommendation (i.e., degree of safety) is presented to the user in one or more displays (512). The method is automatically repeated each time a user control gesture is detected.

The method (and the main processing unit 302) of the invention may be implemented in a typical computer hardware configuration, which may be incorporated into the vehicle. That is, the method (and the main processing unit 302) may be implemented in a dedicated processor or in the main computer system of the vehicle. Additionally, a different aspect of the invention includes a computer-implemented method for performing at least certain steps in the above method. Such a method may be implemented, for example, by operating a computer, as embodied by a digital data processing apparatus, to execute a sequence of machine-readable instructions. These instructions may reside in various types of storage media. Thus, this aspect of the present invention is directed to a programmed product, including storage media (or a storage device) tangibly embodying a program of machine-readable instructions executable by a digital data processor to perform the above method.

This storage media may include, for example, a RAM contained within the CPU, as represented by the fast-access storage for example. Alternatively, the instructions may be contained in another storage media, such as a magnetic data storage diskette, compact disc, or other removable storage media/device, directly or indirectly accessible by the CPU.

The information about the driver's intention to change lanes can be used to adjust or prepare certain electronic systems (through control by the central processing unit 302) in the vehicle for the upcoming lane change. The overall benefit of the proposed system is that the driver is presented with a preview of whether it is safe to change lanes at a certain point in time without actually having to actuate the turn signal and, thereby, confusing other drivers on the road. The system will also deepen the trust of the driver with respect to the vehicle assistant systems since the vehicle is essentially aware of the driver's intentions even before the actual event.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A system, comprising:
   a turn signal lever, the turn signal lever comprising at least one sensor, the at least one sensor configured to detect a touch and a proximity of a user's finger or hand;
   at least one exterior sensor configured to detect a condition of an area surrounding a vehicle; and a display configured to display information about the condition of the area surrounding the vehicle, wherein
the display displays the information when the at least one sensor detects the touch by the user's finger or hand,
the display displays the information when the at least one sensor detects the user's finger or hand in the proximity of the at least one sensor, and
the system learns a behavior of a user based on sensing the touch and the proximity of the user's finger or hand and adjusts direction detection for the user based on the behavior or the user.

2. The system according to claim 1, wherein the information includes a recommendation regarding an intended driving maneuver based on information detected by the at least one exterior sensor.

3. The system according to claim 1, wherein the turn signal lever further comprises an electronic control unit configured to receive and process sensor information from the at least one sensor.

4. The system according to claim 1, further comprising a processing unit configured to receive sensor information from the at least one sensor and the information detected by the at least one exterior sensor.

5. The system according to claim 4, wherein the processing unit is configured to trigger a visualization of the information detected by the at least one exterior sensor based on the sensor information from the at least one sensor.

6. The system according to claim 4, wherein the processing unit is configured to distinguish between intended actuation of the lever by the user for a left turn or a right turn.

7. The system according to claim 1, wherein the at least one sensor comprises:
a top sensor configured to detect a touch and a gesture proximate of a top surface of the lever; and
a bottom sensor configured to detect a touch and a gesture proximate of a bottom surface of the lever.

8. The system according to claim 7, further comprising a side sensor configured to detect a touch and a gesture proximate the end of the lever.

9. The system according to claim 1, wherein the display is configured to display color-coded information indicating a degree of safety for performing the intended driving maneuver.

10. The system according to claim 1, wherein the display comprises an LED strip disposed on a vehicle side mirror.

11. A vehicle, comprising the system according to claim 1.

12. The system according to claim 1, wherein the user's finger or hand is in the proximity of the at least one sensor when the user's finger or hand is within a near field of, but not touching the at least one sensor.

13. A method comprising:
detecting a touch of a user's finger or hand on a turn signal lever using a sensor that is configured to detect a touch and a proximity of the user's finger or hand;
detecting the user's finger or hand in the proximity of the sensor;
transmitting data to a control unit when the touch of the user's finger or hand is detected by the sensor;
transmitting the data to the control unit when the user's finger or hand is detected in the proximity of the sensor;
determining a condition surrounding a vehicle using an exterior sensor;
transmitting information regarding the condition surrounding the vehicle to the control unit;
displaying a visual representation of the information regarding the condition surrounding the vehicle based on the transmitted data;
learning a behavior of a user based on sensing the touch and the proximity of the user's finger or hand; and
adjusting direction detection for the user based on the behavior or the user.

14. The method according to claim 13, wherein the information comprises a degree of safety for performing the intended driving maneuver.

15. A computer-readable storage medium tangibly embodying a program of machine-readable instructions executable by a digital processing apparatus to perform the method of claim 13.

16. The system according to claim 13, wherein the user's finger or hand is in the proximity of the sensor when the user's finger or hand is within a near field of, but not touching the sensor.

17. A turn signal device, comprising:
a lever;
wherein the lever includes at least one sensor configured to detect a touch and a proximity of a user's finger or hand, and
wherein the turn signal device learns a behavior of a user based on sensing the touch and the proximity of the user's finger or hand and adjusts direction detection for the user based on the behavior or the user.

18. The turn signal device according to claim 17, further comprising an electronic control unit configured to receive and process sensor information from the at least one sensor.

19. The turn signal device according to claim 18, wherein the electronic control unit is configured to distinguish between intended actuation of the lever by the user for a left turn or a right turn.

20. The turn signal device according to claim 17, wherein the at least one sensor comprises:
a top sensor configured to detect a touch and a gesture proximate of a top surface of the lever; and
a bottom sensor configured to detect a touch and a gesture proximate of a bottom surface of the lever.

21. The turn signal device according to claim 20, further comprising a side sensor configured to detect a touch and a gesture proximate the end of the lever.

22. The system according to claim 17, wherein the user's finger or hand is in the proximity of the at least one sensor when the user's finger or hand is within a near field of, but not touching the at least one sensor.

23. A system, comprising:
a turn signal lever have a top surface, a bottom surface and a side surface, the turn signal lever comprising a top sensor configured to detect a touch and a gesture proximate of the top surface of the turn signal lever; a bottom sensor configured to detect a touch and a gesture proximate of the bottom surface of the turn signal lever and a side sensor configured to detect a touch and a gesture proximate the side surface of the lever;
at least one exterior sensor configured to detect a condition of an area surrounding a vehicle; and
a display configured to display information about the condition of the area surrounding the vehicle, wherein
the display displays the information when at least one of the top sensor, the bottom sensor and the side sensor detects the touch by the user's finger or hand,
the display displays the information when at least one of the top sensor, the bottom sensor and the side sensor detects the user's finger or hand in the proximity of the at least one of the top sensor, the bottom sensor and the side sensor,
when the side sensor detects the touch by the user's finger or hand or the user's finger or hand in the proximity of the side sensor after the display displays the information as a result of the detection of the touch by the user's finger or hand or the user's finger or hand in the proximity by the top sensor or the bottom sensor, the display cancels displaying the information, and when the top sensor and the bottom sensor and/or the side sensor detect the touch by the user's finger or hand or the user's finger or hand in the proximity thereof, the display displays the information corresponding to the detection by the top sensor and the information corresponding to the detection by the bottom sensor.

* * * * *